3,328,461
METHOD OF PREPARING BENZENE
CARBOXYLIC ACIDS
Perry A. Argabright and Alan H. Peterson, Littleton, Colo., assignors to Marathon Oil Company, Findlay, Ohio, a corporation of Ohio
No Drawing. Filed Aug. 3, 1964, Ser. No. 387,235
13 Claims. (Cl. 260—524)

The present invention relates to an improved method of preparing benzene carboxylic acids, particularly mono- and dicarboxylic acids from dimethyl benzenes. In its more specific and especially advantageous aspects, the present invention relates to an unique method of preparing terephthalic acid from para-xylene.

Heretofore, the selective oxidation of the alkyl substituents of dialkylbenzenes such as para- and meta-xylene, utilizing strong oxidizing agents exemplified by chromic acid, to produce the corresponding benzene mono-and dicarboxylic acids, has not yielded satisfactory results. This has been due, in the main, to the penchant of the oxidizing agent for indiscriminately attacking the ring system of the compounds to produce substantial quantities of undesired ring system by-products to the exclusion of the desired benzene carboxylic acids.

The present invention is based upon certain discoveries, hereafter set forth in detail, which enable the production, in substantial yields, of mono-and dicarboxylic acids from dialkylbenzenes, particularly dimethyl benzenes in which the methyl groups are in the 1,3 and 1,4 positions, by direct oxidation with a strong oxidizing agent while preserving the integrity of the benzene nucleus.

The invention is based, in part, upon the discovery that when a dialkylbenzene, exemplified particularly by para-xylene, advantageously dissolved in an inert solvent, is introduced into a solution of a strong oxidant, especially desirably an oxidant solution containing hexavalent chromium, in the presence of an agent which, among other things, is capable of controlling the water formed during the reaction, the oxidation of the dialkylbenzene can be moderated to selectively oxidize the alkyl substituents thereof to give the corresponding mono- and dicarboxylic acids. Yields of the acids range from approximately 85% to 95% and, significantly, particularly from an economic standpoint, are attained at relatively low temperatures and at normal or atmospheric pressure.

Especially preferred procedures, (1) for preparing monocarboxylic acids and (2) for preparing dicarboxylic acids, in accordance with the method of the present invention, may be outlined as follows, it being understood, however, that other procedures may be utilized without departing from the novel principles and teachings set forth herein:

(1) To a solution of an oxidant containing hexavalent chromium and a water-of-reaction controlling agent, a solvent solution of a dialkylbenzene is added at a rate to maintain the temperature within a range compatible with side chain oxidation. After the reaction has subsided or appears to have gone to completion, a small quantity of an oxidant regenerating agent is added to the reaction mixture, again at a rate to maintain the temperature of the reaction mixture within the proper range. The monocarboxylic acid produced is thereafter isolated in accordance with standard product recovery techniques. Thus, by way of illustrating the described selective alkyl partial oxidation procedure for preparing monocarboxylic acids, para-xylene, dissolved in an inert solvent, is incrementally added with agitation and under controlled temperature conditions to a solution containing an oxidant, for example, chromic acid, and a water-of-reaction controlling agent, most advantageously acetic anhydride. After all of the para-xylene has been added to the oxidant solution and the reaction has subsided, a small quantity of a strong mineral acid such as sulfuric acid is introduced incrementally into the reaction mixture to regenerate hexavalent chromium. The para-toluic acid thus formed is thereafter recovered from the reaction mixture.

(2) To prepare dicarboxylic acids from dialkylbenzenes in accordance with the practice of this invention, the steps outlined above in connection with the preparation of monocarboxylic acids are followed. When addition of the oxidant regenerating agent is completed, another aliquot of the oxidant is added to the reaction mixture and the reaction is allowed to proceed exothermically within certain limits hereafter described. After the reaction subsides, an additional small quantity of the oxidant regenerating agent is added. Thereafter the dicarboxylic acid formed is recovered by known practices. This procedure may be conveniently illustrated by again employing para-xylene as the starting material. As described in procedure (1), after the oxidation reaction subsides, a small quantity of sulfuric acid is added to the reaction mixture. Following this addition, chromic acid in an amount substantially equal to that contained in the starting oxidant solution is introduced into the reaction mixture. The reaction is allowed to proceed exothermically, cooling only if necessary to maintain the reaction mixture at a temperature compatible with the production of optimum yields of the dicarboxylic acid formed, but at a temperature substantially higher than the temperature at which the initial reaction is carried out. After the reaction subsides, another small quantity of sulfuric acid is added to the reaction mixture. Thereafter, the terephthalic acid formed is recovered in accordance with known techniques.

As indicated hereinabove, the objectives of the method of the present invention most advantageously are attained by carrying out the oxidation of the dialkylbenzene in a solution containing hexavalent chromium. There are a number of oxidizing chromium compounds and chromyl compounds having utility in this connection, exemplary thereof being chromium trioxide or chromic anhydride, sodium bichromate, potassium dichromate, chromic oxychloride, chromyl amide, and the like. Of this group of compounds, chromium trioxide is especially preferred as the oxidant.

The proportions of oxidizing chromium compound and dialkylbenzene used in the practice of the method of this invention can be varied. Thus, by way of illustration, in utilizing chromium trioxide as the oxidant and para-xylene as the dialkylbenzene to prepare the corresponding monocarboxylic acid, namely, para-toluic acid, approximately stoichiometric or theoretical proportions of chromium trioxide and para-xylene, that is, a chromium trioxide to para-xylene molar ratio of about 2:1 are employed, with especially satisfactory results being obtained when the chromium trioxide is used in moderate excess, more specifically, of the order of from 5 to 25%, usually about 10 to 15 or 20%, over theoretical. In carrying the oxidation further, as outlined in procedure (2) above, to obtain directly the corresponding dicarboxylic acid, in the instant illustration, terephthalic acid, similar additional quantities of chromium trioxide are employed to convert the monocarboxylic acid present in the reaction mixture to the dicarboxylic acid.

The vehicle or medium employed for contacting the oxidant with the dialkylbenzene should, of course, be substantially unreactive with respect both to the reactants as well as the benzene carboxylic acids formed therefrom. A particularly preferred substance for this purpose is substantially anhydrous acetic acid, especially glacial acetic acid. Other materials having utility in the invention for this purpose may be exemplified by propionic acid, butyric acid, valeric acid and certain gamma and delta lactones such as gamma-butyrolactone and delta-valerolactone.

In preparing benzene mono- and dicarboxylic acids in accordance with the practice of the method of the present invention, water is formed in the reaction mixture. Unless controlled, this water of reaction tends to retard the rate of the oxidation reaction while concomitantly accelerating decomposition of the benzene nucleus. Accordingly, it has been discovered that the generally optimum objectives of the present invention are achieved when the oxidation is carried out in the presence of an agent which, while being substantially inert with respect to the reactants and the products formed therefrom, is capable, under the conditions of he reaction, of removing in situ the water formed during the reaction. This result is most advantageously attained in the method of this invention by the utilization of an acid anhydride such as, for example, acetic anhydride, propionic anhydride, n-butyric anhydride, n-valeric anhydride, phthalic anhydride, succinic anhydride, benzoic anhydride, naphthalic anhydride, and the like. Of this group, acetic anhydride is particularly preferred. The anhydride conveniently may be introduced into the reaction mixtuer with the dialkylbenzene, or, more desirably, it may be included as a component of the vehicle or medium for the oxidant. The quantity of the anhydride employed may vary within appreciable limits, the only condition to be satisfied in this regard being that there always be present in the reaction mixture a sufficient quantity of the anhydride to remove the water formed during the reaction. Generally speaking, the anhydride should comprise from 1 or 2 to 10% by volume of the reaction mixture. Excellent results, for example, can be obtained utilizing in the oxidant solution, a mixture of glacial acetic acid and acetic anhydride in a volume ratio of 9 parts of glacial acetic acid to 1 part of acetic anhydride.

Due to the general exothermic character of the oxidation reaction, the dialkylbenzene desirably is added in increments to the oxidant solution at a rate sufficient to maintain the reaction mixture within the desired temperature range. The attainment of this objective is facilitated when the dialkylbenzene is added in the form of a solvent solution thereof. A particularly convenient and desirable solution of the dialkylbenzene can be formed by first preparing of glacial acetic acid-acetic anhydride solution as described above and, prior to the incorporation therein of the oxidant, utilizing from 10 to 20 volume percent of the solution as a vehicle for the dialkylbenzene starting material.

The amount of ring system decomposition occurring in the reaction mixture formed in accordance with the practice of the method of the present invention has been found to bear a direct relationship to the temperature of the mixture. The rapid rise in temperature due to the exothermicity of the reaction, particularly at the commencement of the reaction, unless controlled can, therefore, have a substantial adverse effect on yields of the desired benzene carboxylic acids. Generally speaking, incremental addition of the dialkylbenzene, as suggested above, together with external cooling, effectively serve to maintain the reaction mixture within optimum temperature ranges. During the initial stages of the reaction, the temperature of the reaction mixture should be held within a range of from about 15° C. to about 30° C., especially advantageously at from 20° C. to 25° C. In carrying the oxidation of the dialkylbenzene to the production of the corresponding dicarboxylic acid, as outlined in procedure (2) herein, the reaction may be allowed to exotherm following the addition of the second aliquot of the oxidant. The temperature of the reaction mixture during this stage will rise to upwards of 75° C. to 80° C. with no noticeable adverse effects on either the reactants or the products formed therefrom.

In accordance with the method of the present invention, it has further been discovered that more efficient utilization of the oxidant can be attained by the addition to the reaction mixture, after heat evolution has substantially ceased, of a small quantity of an oxidant regenerating agent. It is believed that, during the oxidation reaction, the hexavalent chromium forms a complex which renders it substantially inert with respect to the dialkylbenzene. The oxidant regenerating agent serves effectively to liberate the complexed hexavalent chromium enabling it to partake in the side chain oxidation of the dialkylbenzene. Sulfuric acid most advantageously is employed for this purpose. The acid desirably is added in solution with an inert diluent such as glacial acetic acid. Further, to avoid benzene ring attack by the acid, only enough of the diluted acid solution is utilized to free the hexavalent chromium. Generally speaking, from about 2 to 8, usually 3 to 5 or 6, volume percent of sulfuric acid in the reaction mixture is sufficient to effect the desired result. In those instances wherein acetic anhydride is employed as the water of reaction controlling agent, the oxidant regenerating agent most advantageously is introduced into the reaction mixture after the oxidation reaction has subsided, the primary reason for this being that sulfuric acid and acetic anhydride are incompatible at temperatures above about 25° C. and can lead to destructive reduction of the hexavalent chromium to its trivalent form.

The following are illustrative specific examples of the manner of carrying out the present invention:

EXAMPLE 1

To a slurry of 6 grams (60 mmoles) of chromium trioxide in 90 ml. of a glacial acetic acid-acetic anhydride blend (9:1), 2.65 grams (25 mmoles) of para-xylene in 10 ml. of the glacial acetic acid-acetic anhydride blend are added dropwise. The temperature of the reaction mixture is maintained at 20° C. by means of an ice bath. The reaction is allowed to proceed for 2 hours. When evolution of heat appears to have ceased, 5 ml. of sulfuric acid in 10 ml. of glacial acetic acid is added slowly at 20° C. and the reaction is allowed to continue for a half hour. Product analysis shows a yield of 88.8% para-toluic acid (based on para-xylene).

EXAMPLE 2

The steps outlined in Example 1 are carried out up to and including the addition of the sulfuric acid-glacial acetic acid solution. Thereafter, an additional 6 grams (60 mmoles) of chromium trioxide are added to the reaction mixture and the reaction is allowed to proceed exothermically. The temperature of the reaction mixture rises to 75° C. After the reaction mixture has cooled to 20° C., 5 ml. of sulfuric acid in 10 ml. of glacial acetic acid is added. The reaction mixture is stirred for an additional half hour after which it is poured into three times its volume of water and filtered. The solid is washed with water and dried. Analysis of the solid shows a 92% yield of terephthalic acid (based on para-xylene).

EXAMPLE 3

To a slurry of 6 grams (60 mmoles) of chromium trioxide in 90 ml. of a glacial acetic acid-acetic anhydride blend (9:1), 2.65 grams (25 mmoles) of meta-xylene in 10 ml. of the glacial acetic acid-acetic anhydride blend are added dropwise. The temperature of the reaction is maintained at 25° C. by means of an ice bath. The reaction is allowed to proceed for an hour and a half. When the reaction has subsided, 3 ml. of sulfuric acid in 10 ml. of glacial acetic acid is added slowly with stirring and the reaction is allowed to continue for another 20 minutes. The reaction mixture is worked up as before to yield meta-toluic acid.

EXAMPLE 4

The steps described in Example 3 are carried out up to and including the addition of the sulfuric acid-glacial acetic acid solution. Thereafter, the steps described in Example 2 are followed, yielding isophthalic acid.

The method of the present invention provides an extremely effective, economical, and efficient direct route to the preparation of important benzene mono- and dicarboxylic acids such as para-toluic acid and especially terephthalic acid by oxidative conversion of the corresponding dialkylbenzene. It should be understood that while detailed illustrative procedures for carrying out the method of this invention have been described, various changes and modifications may be made therein without departing from the spirit of this invention.

What is claimed as new and desired to be protected by Letters Patent of the United States is.

1. A method of preparing benzene mono- and dicarboxylic acids comprising forming a reaction mixture of a dialkylbenzene selected from the group consisting of dimethyl benzenes in which the methyl substituents thereof are in the 1,3 and 1,4 positions with a substantially anhydrous inert solvent solution of an oxidant containing hexavalent chromium in the presence of an acid anhydride and recovering the benzene carboxylic acids formed.

2. A method of preparing benzene mono- and dicarboxylic acids comprising forming a reaction mixture of a dialkylbenzene selected from the group consisting of dimethyl benzenes in which the methyl substituents thereof are in the 1,3 and 1,4 positions with a substantially anhydrous inert solvent solution of an oxidant containing hexavalent chromium in the presence of an acid anhydride, allowing the reaction to proceed until heat evolution substantially subsides, adding a hexavalent chromium regenerant to the reaction mixture, and recovering the benzene carboxylic acids formed.

3. A method of preparing benzene dicarboxylic acids comprising forming a reaction mixture of dialkyl benzene selected from the group consisting of dimethyl benzenes in which the methyl substitutents thereof are in the 1,3 and 1,4 positions with a substantially anhydrous inert solvent solution of an oxidant containing hexavalent chromium in the presence of acid anhydride, allowing the reaction to proceed until heat evolution subsides, adding a hexavalent chromium regenerant to the reaction mixture, thereafter adding an additional quantity of the oxidant solution, adding another aliquot of the hexavalent chromium regenerant, and recovering the dicarboxylic acid formed.

4. A method of preparing benzene mono- and dicarboxylic acids comprising forming a reaction mixture of a dialkylbenzene selected from the group consisting of para- and meta-xylene, with a substantially anhydrous inert solvent solution of an oxidant containing hexavalent chromium in the presence of acetic anhydride, and recovering the benzene carboxylic acids formed.

5. A method of preparing benzene mono-dicarboxylic acids comprising forming a reaction mixture of a dialkylbenzene selected from the group consisting of para- and meta-xylene with a substantially anhydrous acetic acid solution of an oxidant containing hexavalent chromium in the presence of acetic anhydride, and recovering the benzene carboxylic acids formed.

6. A method of preparing benzene mono- and dicarboxylic acids comprising forming a reaction mixture of a dialkylbenzene selected from the group consisting of para- and meta-xylene with a substantially anhydrous inert solvent solution of an oxidant containing hexavalent chromium in the presence of acetic anhydride, allowing the xylene and the oxidant to react at a temperature in the range of from 15 to 30° C., and recovering the benzene carboxylic acids formed.

7. A method of preparing benzene mono- and dicarboxylic acids comprising forming a reaction mixture of a dialkylbenzene selected from the group consisting of para- and meta-xylene with a solution of about 9 parts by volume of substantially anhydrous acetic acid and 1 part by volume of acetic anhydride containing a hexavalent chromium oxidant, allowing the reaction between the xylene and the oxidant to go to substantial completion, and recovering the benzene carboxylic acids formed.

8. A method of preparing terephthalic acid comprising forming a reaction mixture of para-xylene with a substantially anhydrous inert solvent solution of an oxidant containing hexavalent chromium in the presence of acetic anhydride, allowing the reaction between the para-xylene and the oxidant to go to substantial completion, adding more of the oxidant, and recovering the terephthalic acid formed.

9. A method of preparing terephthalic acid comprising forming a reaction mixture of para-xylene with a substantially anhydrous acetic acid solution of chromium trioxide containing acetic anhydride, allowing the reaction between the para-xylene and the chromium trioxide to go to substantial completion, adding more of the chromium trioxide, and recovering the terephthalic acid formed.

10. A method of preparing terephthalic acid comprising forming a reaction mixture of para-xylene with a substantially anhydrous acetic acid solution of chromium trioxide in the presence of acetic anhydride, allowing the reaction between the para-xylene and the chromium trioxide to go to substantial completion while maintaining the reaction mixture at a temperature of from about 20 to 25° C., adding more of the chromium trioxide and allowing the reaction to go to completion, and recovering the terephthalic acid formed.

11. A method of preparing terephthalic acid comprising forming a reaction mixture of para-xylene in glacial acetic acid with a substantially anhydrous solution of about 9 parts by volume of glacial acetic acid and 1 part by volume of acetic anhydride containing chromium trioxide, allowing the reaction between the para-xylene and the chromium trioxide to go to substantial completion while maintaining the reaction mixture at a temperature of from about 20 to 25° C., adding more of the chromium trioxide and allowing the reaction to proceed exothermically, and recovering the terephthalic acid formed.

12. A method of preparing para-toluic acid comprising forming a reaction mixture of para-xylene with a substantially anhydrous glacial acetic acid solution of an oxidant containing hexavalent chromium in the presence of acetic anhydride, and recovering the para-toluic acid formed.

13. A method of preparing para-toluic acid comprising forming a reaction mixture of para-xylene with a substantially anhydrous glacial acetic acid solution of chromium trioxide in the presence of acetic anhydride, allowing the para-xylene and the chromium trioxide to react at a temperature of from about 20 to 25° C., and recovering the para-toluic acid formed.

References Cited
UNITED STATES PATENTS 2,727,919  12/1955  Saunders _____ 260—524

LORRAINE A. WEINBERGER, *Primary Examiner.*

SIDNEY B. WILLIAMS, JR., *Assistant Examiner.*